US012419303B2

(12) United States Patent
Sexton et al.

(10) Patent No.: US 12,419,303 B2
(45) Date of Patent: Sep. 23, 2025

(54) TRANSPARENT OR SEMITRANSPARENT INVERSE MICROLATICES OF POLYACRYLAMIDE AS OIL EMULSION DRIFT REDUCING AGENT

(71) Applicant: EXACTO, INC., Sharon, WI (US)

(72) Inventors: Franklin E. Sexton, Sharon, WI (US); Ryan T. Strash, Sharon, WI (US); Glen R. Obear, Sharon, WI (US)

(73) Assignee: EXACTO, INC., Sharon, WI (US)

( * ) Notice: Subject to any disclaimer, the term of this patent is extended or adjusted under 35 U.S.C. 154(b) by 886 days.

(21) Appl. No.: 17/438,892

(22) PCT Filed: Mar. 13, 2020

(86) PCT No.: PCT/US2020/022677

§ 371 (c)(1),
(2) Date: Sep. 13, 2021

(87) PCT Pub. No.: WO2020/186182

PCT Pub. Date: Sep. 17, 2020

(65) Prior Publication Data

US 2022/0142152 A1 May 12, 2022

Related U.S. Application Data

(60) Provisional application No. 62/818,443, filed on Mar. 14, 2019.

(51) Int. Cl.

| | |
|---|---|
| *A01N 25/04* | (2006.01) |
| *A01N 37/22* | (2006.01) |
| *A01N 37/40* | (2006.01) |
| *A01N 43/56* | (2006.01) |
| *A01N 43/653* | (2006.01) |
| *A01N 47/08* | (2006.01) |
| *A01N 57/20* | (2006.01) |
| *A01P 3/00* | (2006.01) |
| *A01P 13/00* | (2006.01) |

(52) U.S. Cl.
CPC ............. *A01N 25/04* (2013.01); *A01N 37/22* (2013.01); *A01N 37/40* (2013.01); *A01N 43/56* (2013.01); *A01N 43/653* (2013.01); *A01N 47/08* (2013.01); *A01N 57/20* (2013.01); *A01P 3/00* (2021.08); *A01P 13/00* (2021.08)

(58) Field of Classification Search
CPC ........ A01N 25/04; A01N 37/22; A01N 43/56; A01N 37/40; A01N 43/653; A01N 47/08; A01N 57/20; A01P 3/00; A01P 13/00
See application file for complete search history.

(56) References Cited

U.S. PATENT DOCUMENTS

| | | | | |
|---|---|---|---|---|
| 3,346,494 | A | | 10/1967 | Robbins et al. |
| 3,624,019 | A | | 11/1971 | Anderson et al. |
| 4,052,353 | A | | 10/1977 | Scanley |
| 4,413,087 | A | | 11/1983 | Bernot |
| 4,446,044 | A | | 5/1984 | Rutkiewic |
| 4,681,912 | A | * | 7/1987 | Durand .................... C08F 2/32 210/734 |
| 4,696,962 | A | | 9/1987 | Danner et al. |
| 4,904,695 | A | | 2/1990 | Bell |
| 4,915,859 | A | | 4/1990 | Kerr et al. |
| 4,956,399 | A | | 9/1990 | Kozakiewicz et al. |
| 5,037,653 | A | | 8/1991 | Dawson |
| 5,037,654 | A | | 8/1991 | Puritch et al. |
| 5,292,800 | A | | 3/1994 | Moench et al. |
| 5,317,042 | A | | 5/1994 | Narayanan |
| 5,490,943 | A | | 2/1996 | Eicken et al. |
| 5,549,840 | A | | 8/1996 | Mondin et al. |
| 5,587,357 | A | | 12/1996 | Rhinesmith |
| 5,612,047 | A | | 3/1997 | Duffy et al. |
| 5,656,289 | A | | 8/1997 | Cho et al. |
| 5,763,530 | A | | 6/1998 | Chen et al. |
| 5,811,383 | A | | 9/1998 | Klier et al. |
| 5,952,398 | A | | 9/1999 | Dietz et al. |
| 5,972,874 | A | | 10/1999 | Libutti |
| 6,025,432 | A | | 2/2000 | Ryan |
| 6,110,981 | A | | 8/2000 | Davies et al. |
| 6,143,830 | A | | 11/2000 | Utz et al. |
| 6,172,031 | B1 | | 1/2001 | Stevens |
| 6,326,013 | B1 | | 12/2001 | Lemann et al. |
| 6,410,605 | B1 | | 6/2002 | Shimada et al. |
| 6,475,974 | B1 | | 11/2002 | Leboucher et al. |

(Continued)

FOREIGN PATENT DOCUMENTS

| | | |
|---|---|---|
| CN | 101933509 | 1/2011 |
| KR | 20000068408 | 11/2000 |

(Continued)

OTHER PUBLICATIONS

A Guide to Using PAM; https://ucanr.edu/sites/uccemontereycounty/files/280667.pdf; site accessed in Jul. 2024 (Year: 2021).*
Inverse microemulsion; Vanderhoff et al.; Inverse Emulsion Polymerization; in Advances in Chemistry; ACS; chapter 2 (Year: 1962).*
Xytect 2F; https://labelsds.com/images/user_uploads/Xytect2F%20SDS%2010-3-22.pdf; site accessed Jul. 2024 (Year: 2022).*
DRA; https://brandt.co/media/5711/brandt-onsite-2017-07-06.pdf; site accessed Jul. 2024 (Year: 2017).*
Applied Polymer Systems, Inc. APS 600 Series Silt Stop, Applied Polymer Systems, Inc, 2002. retrieved from internet Jun. 1, 2022. http://www.siltstop.com/silt_stop_aps_600.html . 3 pages.
Flick et al., Cosmetic Additives—An Industrial Guide, William Andrew Publishing/Noyes. 1991. pp. 401-412.

(Continued)

*Primary Examiner* — Robert A Wax
*Assistant Examiner* — John W Lippert, III
(74) *Attorney, Agent, or Firm* — Casimir Jones, S.C.; Kelly A. Barton

(57) ABSTRACT

The present disclosure provides compositions comprising polyacrylamide microemulsions, for example transparent or semitransparent inverse microlatices of polyacrylamide, and methods and formulations using the compositions for management of crop pests.

14 Claims, 10 Drawing Sheets

(56) References Cited

U.S. PATENT DOCUMENTS

| | | |
|---|---|---|
| 6,531,442 B1 | 3/2003 | Durbut |
| 6,686,417 B1 | 2/2004 | Reekmans et al. |
| 6,709,716 B2 | 3/2004 | Uy et al. |
| 6,803,345 B2 | 10/2004 | Herold et al. |
| 6,835,761 B2 | 12/2004 | Harrison |
| 7,074,752 B2 | 7/2006 | Gordon |
| 9,307,758 B2 | 4/2016 | Sexton et al. |
| 9,309,378 B2 * | 4/2016 | Sexton ............ C08K 5/09 |
| 9,357,769 B2 | 6/2016 | Sexton et al. |
| 9,428,630 B2 | 8/2016 | Sexton et al. |
| 9,631,082 B2 | 4/2017 | Sexton et al. |
| 10,138,366 B2 | 11/2018 | Sexton et al. |
| 10,647,845 B2 | 5/2020 | Sexton et al. |
| 2003/0069135 A1 | 4/2003 | Kober et al. |
| 2003/0147825 A1 | 8/2003 | Chiarelli et al. |
| 2004/0194658 A1 | 10/2004 | Konno et al. |
| 2005/0101510 A1 | 5/2005 | Mondin et al. |
| 2005/0118210 A1 | 6/2005 | Kachi et al. |
| 2005/0234166 A1 | 10/2005 | Lau |
| 2005/0239957 A1 | 10/2005 | Pillsbury et al. |
| 2006/0003907 A1 | 1/2006 | Krishnan |
| 2006/0004130 A1 | 1/2006 | Strominger et al. |
| 2006/0289137 A1 | 12/2006 | Gelman et al. |
| 2007/0049496 A1 | 3/2007 | Messerschmidt et al. |
| 2007/0197418 A1 | 8/2007 | Rahse |
| 2007/0219315 A1 | 9/2007 | Braun |
| 2010/0037513 A1 | 2/2010 | Petrucci et al. |
| 2013/0231429 A1 | 9/2013 | Sexton et al. |
| 2014/0323312 A1 | 10/2014 | Sexton et al. |
| 2014/0323609 A1 | 10/2014 | Sexton et al. |
| 2014/0378554 A1 | 12/2014 | Sexton et al. |
| 2017/0006859 A1 * | 1/2017 | Raman ............ A01N 25/30 |

FOREIGN PATENT DOCUMENTS

| | | |
|---|---|---|
| WO | WO 88/10274 | 12/1988 |
| WO | WO 2005/077336 | 8/2005 |
| WO | WO 2014/158175 | 10/2014 |

OTHER PUBLICATIONS

Flick et al., Industrial Surfactants, Noyles Publications, Second Edition, 1993. p. 240.

Fritz et al., Measuring Spray Droplet Size from Agricultural Nozzles Using Laser Diffraction. J Vis Exp. Sep. 16, 2016;(115):54533. 7 pages.

International Search Report , PCT/US2013/034468, Dec. 16, 2013. 3 pages.

International Search Report and Written Opinion for PCT/US2020/022677. Mailed May 11, 2020. 10 pages.

Lentz et al., Field Results using polyacrylamide to manage furrow erosion and infiltration. Soil Science, Oct. 1994, vol. 158, Issue 4. 9 pages.

Ozkan et al., Effect of Major Variables on Drift Distances of Spray Droplets. Ohio State University—College of Food, Agricultural, and Environmental Sciences Fact Sheet. Apr. 4, 2016. 21 pages.

Polyacrylamide (PAM) Definition, pp. PM-1-PM-5. http://www.michigan.gov/documents/deq/nps-polyacrylamide_332130_7.pdf, published Feb. 12, 2010. 5 pages.

Alves G.S., et al., "Spray Drift and Droplet Spectrum from Dicamba Sprayed Alone or Mixed with Adjuvants Using Air-Induction Nozzles", Pesquisa Agropecuaria Brasileira, vol. 53, No. 6, Jun. 2018, pp. 693-702.

Miller P.C.H., et al., "Effects of Formulation on Spray Nozzle Performance for Applications from Ground-Based Boom Sprayers", Crop Protection, vol. 19, 2000, pp. 609-615.

* cited by examiner

FIG. 7A

TRANSPARENT OR SEMITRANSPARENT INVERSE MICROLATICES OF POLYACRYLAMIDE AS OIL EMULSION DRIFT REDUCING AGENT

CROSS-REFERENCE TO RELATED APPLICATIONS

This application claims the benefit of U.S. Provisional Application No. 62/818,443, filed Mar. 14, 2019, the contents of which is incorporated herein by reference.

FIELD

The present disclosure relates to pesticide formulations, e.g., herbicide formulations, containing transparent or semi-transparent inverse microlatices of polyacrylamide.

BACKGROUND

Herbicide drift is a well-known phenomenon, particularly in spray crop treatment, that can lead to problematic off-target movement, which may cause unintended and unwanted damage to adjacent agricultural fields or rural encroachment leading to chemical trespass. The extent of off-target movement, also known as physical drift, is primarily determined by droplet size. Many factors lead to off-target physical drift, including spray pressures atomized from spray nozzles, spray nozzle types, wind, boom height from application equipment, and speed of spray application equipment.

Droplet size is referred to as spray quality. The American Society of Agricultural and Biological Engineers (ASABE) developed a Droplet Size Classification standard to measure and interpret spray quality from nozzle tips. Spray quality ranges from Very Fine to Ultra Coarse and are expressed or measured by size in microns. Droplet size is often measured by laser diffraction. See Fritz BK and Hoffmann WC J Vis Exp 2016; (1115):54533 and the University of Nebraska-Lincoln Pesticide Application Technology Lab Droplet Size Calculator, both incorporated herein by reference.

The Environmental Protection Agency (EPA) allows the herbicide dicamba to be sprayed over soybean and cotton seed crops for weed control, but mandates certain test criteria that must be satisfied in order to carry out the spraying. This is a significant development because of the high weed-control efficacy of dicamba. An increasingly important herbicide tank mix for weed control in bioengineered soybean and cotton seed crops includes dicamba (e.g., XtendiMax of Bayer Crop Sciences) in combination with glyphosate (e.g., PowerMax of Bayer Crop Sciences) and clethodim (e.g., Select Max of Valent BioSciences). However, the inclusion of glyphosate and clethodim in the herbicide combination creates a mixture with poor drift control. One or more lipophilic drift reduction adjuvants (DRAs) must be added to provide adequate drift control of the mixture.

The EPA has mandated testing criteria for use of DRAs with dicamba. Because dicamba is often used in combination with glyphosate and clethodim, lipophilic DRAs are selected for the mixture. To the knowledge of the inventors, herbicidal formulations containing the lipophilic adjuvants useful with the above-mentioned combination of herbicides do not pass the EPA mandated tests.

Long chain high molecular weight macro emulsion ("macroemulsion") polyacrylamide (PAM) and water-solution PAM (or solution-based or aqueous PAM) are known drift reduction adjuvants (DRAs) with drift retardant properties related to reduction of pesticide drift, including reducing herbicide drift. Known brands of macroemulsion PAM with drift retardant properties include Polytex A 311, Polytex N 3015, Polytex A 1010, Helena Pointblank WM, and Simplot Guide-It. Macroemulsion and water-solution PAMs have properties that increase viscosity of pesticide tank mixes, especially in agricultural, turf and ornamental, and industry vegetation management practices. Increasing the viscosity of the spray solution increases the droplet size of pesticide sprays, including herbicide sprays. Increasing the droplet size reduces off-target movement of the pesticide spray application, so that the larger droplets do not move as far during spray applications, allowing macroemulsions and water-solution PAMs tank mixes to desirably hit their intended targets, such as weeds in an agriculture crop field. See Ozkan and Zhu, Ohio State University—College of Food, Agricultural, and Environmental Sciences Fact Sheet, "Effect of Major Variables on Drift Distances of Spray Droplets, Apr. 4, 2016.

Solution-based PAM does not contain oil, unlike macroemulsion PAM. Solution PAM is formulated by adding crystalline PAM to water. With agitation and time, the crystalline PAM dissolves into the water, making a thickened solution. Being water-based, this drift retardant type can be added to other adjuvant materials increasing the attributes of the adjuvant in pesticide spray applications. Such materials may include ammonium sulfate, water conditioners, nonionic surfactants, humectants, buffering agents, and deposition aids to name a few.

A drawback of mixing solution-based PAM with herbicides is that the solution-based PAM has a high viscosity, leading to handling challenges and difficulty while manufacturing, including from blending to packaging. Another drawback of solution-based PAM is that it is not sufficiently compatible with lipophilic DRAs (which as mentioned above are highly desirable if not necessary for use with clethodim of a preferred herbicide mixture) to allow their use in tank mix or pre-packaging together, such as for an "in-can" application. Solution-based PAM generally is incompatible and does not mix with lipophilic adjuvants or DRAs. Yet another drawback is that use rates associated with solution-based PAM are much higher than those of macro emulsion PAM. Often 2-4 quarts of solution-based PAM are used per 100 gal of pesticide solution, compared to 2-4 oz of macro-emulsion PAM per 100 gal of pesticide solution, to achieve the same spray quality.

A macroemulsion PAM is characterized by a continuous oil phase and a discontinuous PAM-containing water phase. Macro-emulsion PAMs are unstable in the presence of lipophilic adjuvants, resulting in a short shelf life if premixed. As mentioned above, lipophilic adjuvants are highly desirable if not necessary for use with glyphosate and clethodim of a preferred herbicide mixture. As a consequence, macroemulsion PAM cannot be prepackaged with lipophilic adjuvants such as for "in-can" applications. Macroemulsion PAMs, though well utilized for decades, have not been utilized as a formulating tool.

It would therefore provide a significant advancement in the art to provide a drift reduction adjuvant (DRA) that can be used for pre-packaged (or "in-can") herbicide mixtures, especially those including herbicides that require lipophilic DRAs, such as clethodim or other lipophilic herbicides.

It would be another significant advancement in the art to provide a drift reduction adjuvant (DRA) that can be mixed with herbicide formulations, especially those including lipophilic DRAs, to produce a commercially viable and low drift formulation that passes EPA testing criteria.

SUMMARY

Disclosed herein are compositions comprising a polyacrylamide microemulsion and at least one or both of a pesticide and a crop protection enhancing adjuvant.

In some embodiments, the polyacrylamide microemulsion is an inverse microemulsion. In some embodiments, the polyacrylamide microemulsion is a transparent/semitransparent inverse microlatice polyacrylamide. In some embodiments, the polyacrylamide microemulsion comprises polyacrylamide having less than 30 mole percent anionic charge, having 0-22 mole percent anionic charge, having 3-18 mole percent anionic charge, having 7-15 mole percent anionic charge, or having 15-22 mole percent anionic charge.

The crop protection enhancing adjuvant may be selected from the group consisting of: crop oil concentrates; modified vegetable oils; drift retardants; soil or foliage penetrants; buffering agents; wetting agents; surfactants; nitrogen fertilizers; compatibility agents; defoamers; deposition agents; or combinations thereof. In some embodiments, the crop protection enhancing adjuvant is a lipophilic adjuvant.

In some embodiments, the pesticide comprises an insecticide, a herbicide, a bactericide, a fungicide, a larvicide, or a combination thereof. In some embodiments, the pesticide comprises lipophilic pesticide.

In some embodiments, the composition comprises 0.625-3.5% (v/v) pesticide. In some embodiments, the weight ratio of pesticide to polyacrylamide microemulsion is in a range of 99:1 to 90:10, e.g., 97:3. In some embodiment, the composition comprises a pesticide and 0.125-5% (v/v) of the combination of the polyacrylamide microemulsion and the crop protection enhancing adjuvant.

Also disclosed herein are methods comprising contacting agricultural crops, turf and ornamental, or industrial vegetation management pests with the compositions disclosed herein. In some embodiments, the contacting comprises spraying. In some embodiments, the compositions disclosed herein increase droplet size or decrease the percent volume driftable fraction of a spray compared to a composition lacking the microemulsion PAM.

In some embodiments, a pre-packaged combination of a polyacrylamide (PAM) microemulsion and an herbicide is combined with a lipophilic drift reduction adjuvant (DRA), such as in a tank mix, immediately prior to application.

Other embodiments of the disclosure will be apparent in light of the following detailed description and accompanying figures.

BRIEF DESCRIPTION OF THE DRAWINGS

Figure 7A:
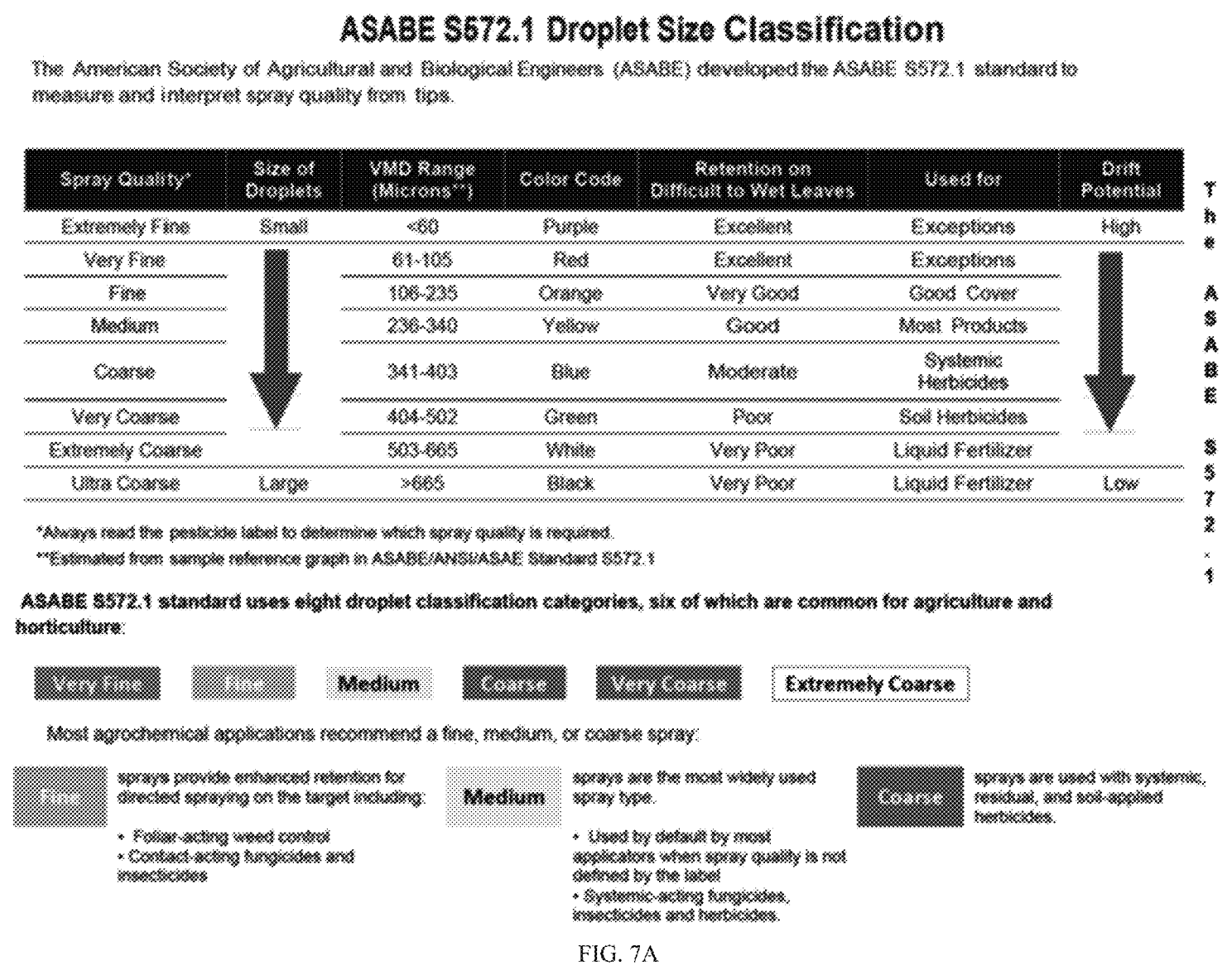

FIG. 7A is the American Society of Agricultural and Biological Engineers (ASABE) Droplet Size Classifications.

DETAILED DESCRIPTION

Figure 1:
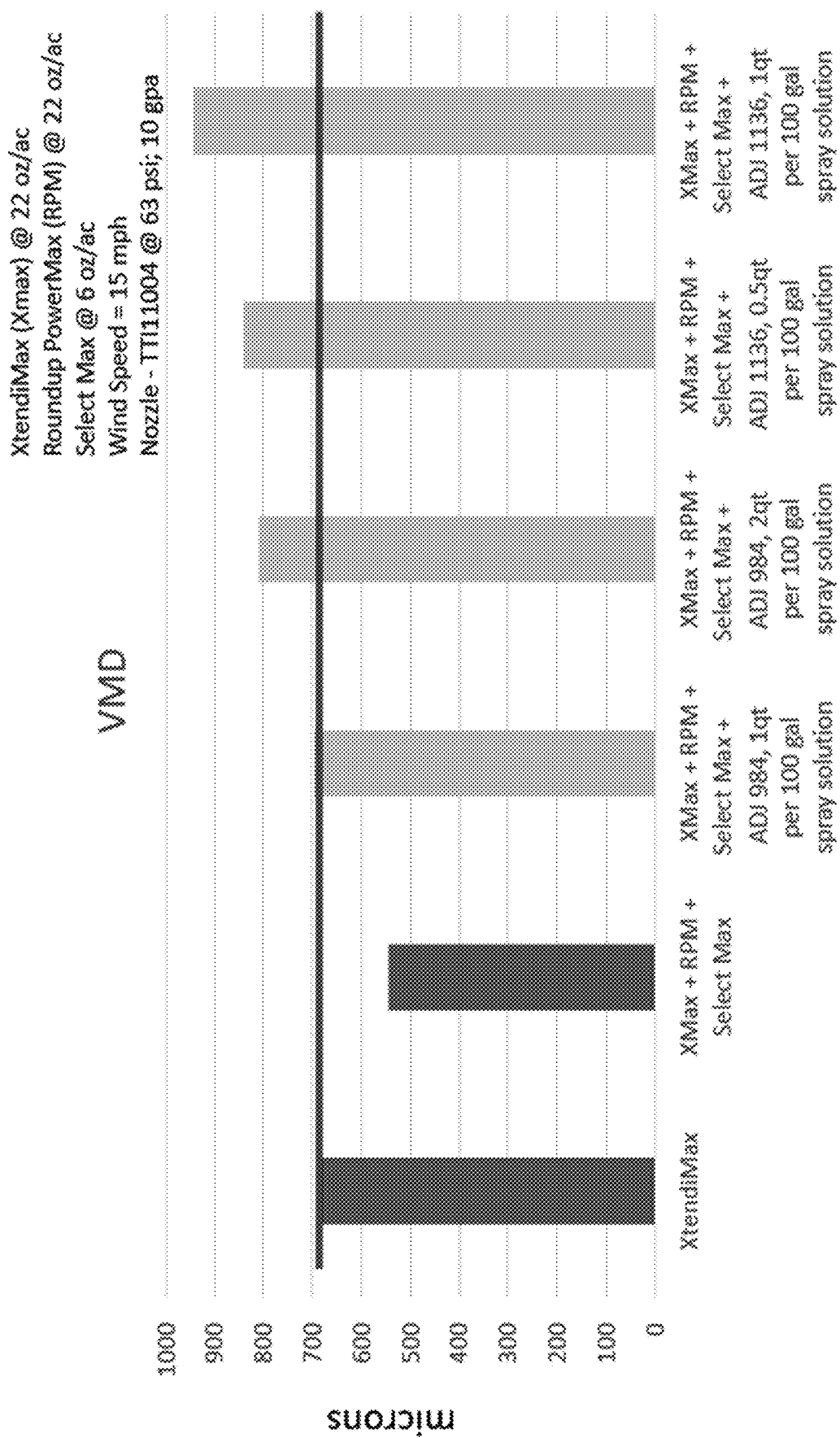
FIG. 1 is a graph of Volume Median Diameter (VMD) of Herbicides and Adjuvants from droplet size wind tunnel tests. Use rates and test parameters are provided in the key to the top right. At or above the line indicates probability to pass EPA wind tunnel AGDISP model.
Figure 2:
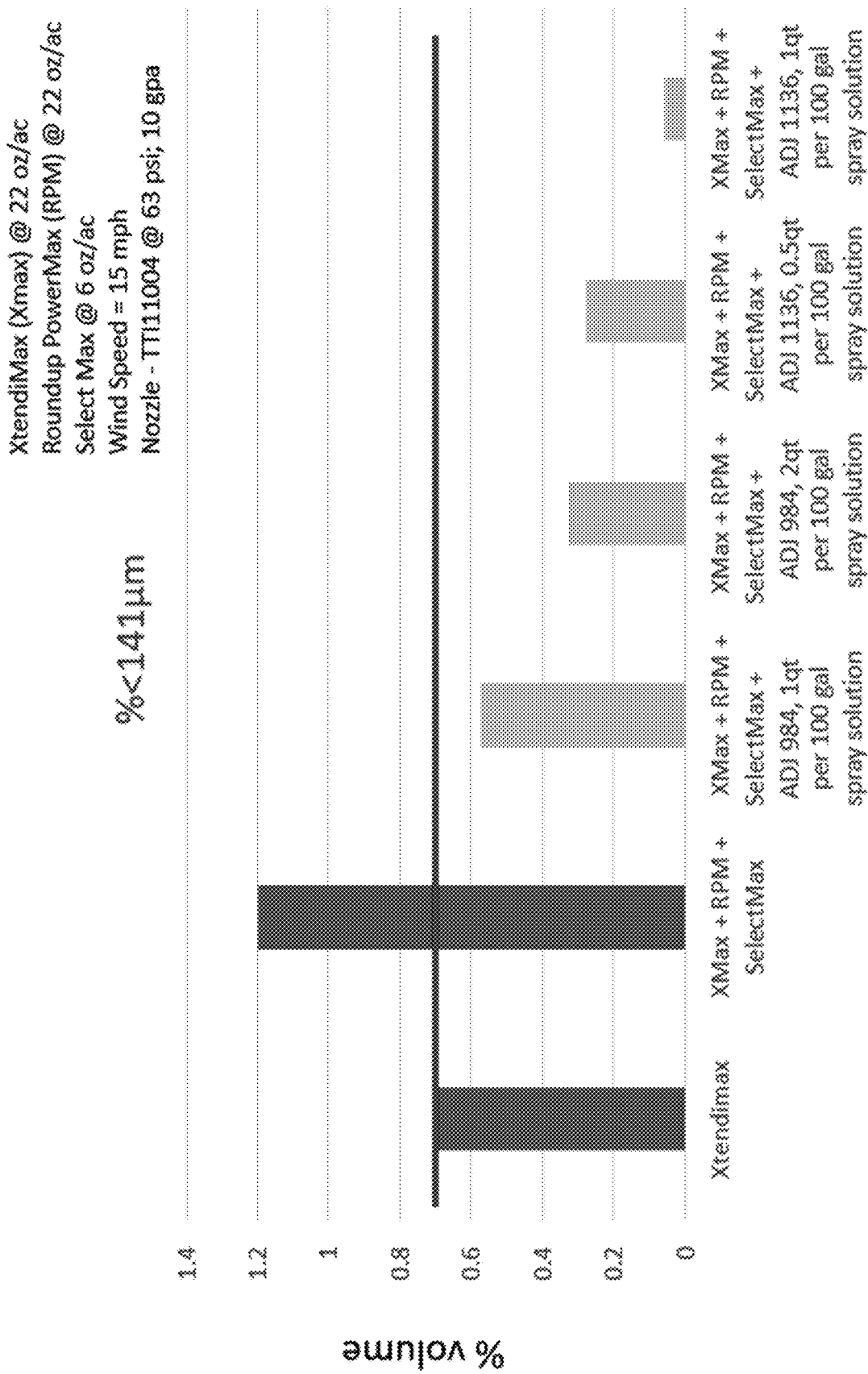
FIG. 2 is a graph of % Volume Driftable Fraction <141 μm of Herbicides and Adjuvants from droplet size wind tunnel tests. Use rates and test parameters are provided in the key to the top right. At or below the line indicates probability to pass EPA wind tunnel AGDISP model.

The present disclosure provides drift reduction adjuvants (DRAs) and adjuvant compositions that can be mixed with pesticides, to produce a commercially viable and low drift pesticide formulation.

Section headings as used in this section and the entire disclosure herein are merely for organizational purposes and are not intended to be limiting.

1. Definitions

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Unless otherwise defined herein, scientific and technical terms used in connection with the present disclosure shall have the meanings that are commonly understood by those of ordinary skill in the art. For example, any nomenclatures used in connection with, and techniques of, cell and tissue culture, molecular biology, immunology, microbiology, genetics and protein and nucleic acid chemistry and hybridization described herein are those that are well known and commonly used in the art. The meaning and scope of the terms should be clear; in the event, however of any latent ambiguity, definitions provided herein take precedent over any dictionary or extrinsic definition. Further, unless otherwise required by context, singular terms shall include pluralities and plural terms shall include the singular.

Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

2. Small Particle Size Emulsion (Microemulsion) Polyacrylamide (PAM) Adjuvant Compositions An embodiment of the invention relates to a small particle size emulsion (or microemulsion) of polyacrylamide (PAM), which offers unexpected formulation development.

Table 1 describes differences between a microemulsion PAM, such as Superfloc A-4377 (previously referred to as E-4374), versus a macroemulsion, such as Superfloc A1883RS.

In some embodiments, the microemulsion PAM is transparent/semitransparent inverse microlatices of polyacrylamide (PAM). The transparent/semitransparent inverse microlatice of polyacrylamide (PAM) may be manufactured as described in U.S. Pat. No. 4,681,912, which is incorporated herein by reference, and which specific reference is made to column 2, line 15 to column 3, line 31. Superfloc A-4377 is an exemplary commercial source of polyacrylamide transparent/semitransparent inverse microlatices.

As used herein, a transparent inverse microemulsion is one that has an average particle size of 150 nm or less. A semitransparent inverse microemulsion is one where the average particle size is close to but may somewhat exceed 150 nm, such as up to 300 nm, with the result that the formulation has a cloudy appearance.

The transparent/semitransparent inverse microlatice of polyacrylamide (PAM) may include at least one or all of the following: acrylic monomers (in aqueous solution), at least one hydrocarbon liquid (in organic phase), and at least one non-ionic or anionic surfactant. The acrylic monomers content of the aqueous phase may range from 20-80% by weight. The acrylic monomers may comprise acrylamide, methacrylamide, acrylic acid or an alkali salt thereof, and methacrylic acid or an alkali salt thereof. The pH of the aqueous solution of acrylic monomers may range from 8 to 13. The organic phase may comprise a hydrocarbon or

TABLE 1

| Characteristics of Micro- and Macro-emulsions. | |
|---|---|
| Microemulsion | Macroemulsion |
| Thermodynamically stable system. Does not separate or settle. | Sterically stabilized. Will separate and settle with time. |
| Particle size = 1 to 300 nm, preferably 50 to 250 nm, and most preferably 100 to 200 nm. | Particle size = 1000 to 3000 nm |
| Generally lower solids systems. (<25 w/w %). | Much higher solids are achievable (>25%) |
| Very low fluid viscosity of the emulsion 20 to 200 cps. Measured using Brookfield DV1 Viscometer: Viscosity: spindle 18, 20° C., 20 rpm, 82.05 cPs, 54.7% (15 mole % - Superfloc A-4377) Viscosity: spindle 18, 20° C., 50 rpm, 38.70 cPs, 64.5% (3 mole % - Superfloc A-4377) | Much higher fluid viscosity of the emulsion 500 to 5000 cps |
| Generally transparent emulsion | Generally opaque emulsions |
| Moderate molecular weight achievable. Less than 10,000,000 Daltons | Very high molecular weights achievable. 10,000,000 to 20,000,000 Daltons. |
| High levels of surfactants required to achieve thermodynamic stability. Standard emulsifiers are used in preparation. | Much lower levels of surfactants can be used to prepare stable emulsion, however they are not thermodynamically stable and will separate and settle with time. Standard emulsifiers are used in preparation. |
| Full range of anionic or cationic charge is possible | Full range of anionic or cationic charge is possible |
| Oil content up to 50 w/w % of the emulsion | Oil content generally <25% of the emulsion |

While the table sets forth general features and characteristics, the term microemulsion as used herein means an emulsion containing polyacrylamide particles having a diameter of 1 nm to 300 nm, and may but does not necessarily include the other features and characteristics set forth in the above table.

Microemulsion PAMs are described in U.S. Pat. Nos. 9,307,758, 9,309,378, and 9,428,630, which are incorporated herein by reference.

In some embodiments, the microemulsion PAM is an inverse microemulsion. Inverse microemulsion PAMs may function as a lipophilic drift reduction agent (DRA) for lipophilic pesticide formulations.

mixture of hydrocarbons, e.g., isoparaffinic hydrocarbons. The weight ratio of the aqueous phase to the hydrocarbon phase is usually as high as possible, for example from 0.5 to 3:1. The at least one non-ionic or anionic surfactant may have a hydrophilic lipophilic balance (HLB) value ranging from 8-11

In some instances, microemulsion PAM formulations are not always compatible with common herbicide tank mixes, such as glyphosate, dicamba, and clethodim herbicides. Incompatible tank mixes can cause an agglomeration of incompatible substances thereby clogging spray nozzles or causing accumulation of undesirable substance to stick near the top or sides of pesticide spray application equipment. As an example, a 30 mole % anionic charge small particle size emulsion PAM-containing adjuvant is not compatible with herbicide tank mixes containing glyphosate, dicamba, and clethodim herbicides.

In some embodiments, the microemulsion PAM comprises polyacrylamide with less than 30 mole % anionic charge. In preferred embodiments, the polyacrylamide of the microemulsion has a 0-22 mole % anionic charge, wherein a 0% charge corresponds to non-ionic PAM. It is more desirable that the anionic charge be in a range of 3-18 mole %, and still more desirable in a range of 7-15 mole % anionic charge. The highest anionic charge with compatibility is most preferred (e.g., 15-22 mole %) to produce the desired property and performance results with the lowest inclusion rate of the small particle size emulsion PAM.

In some embodiments, it is desirable to combine the attributes of microemulsion PAM with other crop protection enhancing components. Crop protection enhancing components or formulations are referred to as adjuvants. Adjuvants are defined by ASTM E1519 as a material added to a tank mix to aid or modify the action of an agrichemical or the physical characteristics of the mixture. Such materials include, but are not limited to, crop oil concentrates, modified vegetable oils (MVO), drift retardants, and nonionic surfactants.

In some embodiments, the crop protection enhancing adjuvant is selected from the group consisting of: crop oil concentrates (e.g., paraffinic oils), modified vegetable oils (e.g., soybean oil ethoxylates, ethoxylated lecithin), drift retardants, soil or foliage penetrants, buffering agents, wetting agents, surfactants (e.g., non-ionic surfactants (EO-PO bock copolymers) anionic surfactants, cationic surfactants and amphoterics), nitrogen fertilizers, compatibility agents, defoamers, deposition agents, or combinations thereof.

Lipophilic adjuvant components include, but are not limited to, paraffin oils, white oils, aromatics, napthenes, alkenes, and fatty oils such as mineral oils, modified vegetable (seed) oils and derivatives. Vegetable oils and derivatives include soybean, canola, coconut, corn, cottonseed, palm, palm kernel, flaxseed, grape seed, peanut, safflower and sunflower, and ethoxylated seed oils, such as ethoxylated soybean oil, ethoxylated methyl esters, such as ethoxylated soybean methyl ester, and ethylated methyl esters. Generally, the fatty acids and derivatives are 10 carbons (preferably 0 double bonds) to 18 carbons (preferably 3 double bonds) in length.

These materials can affect the surface-active properties of pesticide applications positively by increasing pest control attributes, such as increased ability to penetrate waxy cuticles of leaf surfaces and increase droplet spreading on leaf or target surfaces. For reasons discussed above, it is desirable to combine the properties of oil-based adjuvants with drift retardant properties for use in pesticide spray applications.

Exemplary embodiments of the invention combine the desirable small particle size emulsion (microemulsion) PAM with lipophilic adjuvant components in a user-friendly formulation. These formulations overcome the compatibility and handling challenges of the solution-based and macroemulsion polyacrylamides while formulating with desirable pest control adjuvant materials.

Many pest control formulations, especially lipophilic herbicides, are well suited to perform or enhance weed control when tank mixed with lipophilic adjuvants such as modified vegetable oils (MVO), also referred to herein as modified seed oils (MSO), crop oil concentrates (COC), high surfactant oil concentrates (HSOC), and other lipophilic deposition aids. These classes of adjuvant types are defined by ASTM as follows: MVO is an oil, extracted from seeds, that has been chemically modified (e.g., methylated); COC is an emulsifiable petroleum oil-based product containing 15 to 20% w/w/ surfactant and a minimum of 80% w/w phytobland oil, and HSOC is an emulsifiable oil based product containing 25-50% w/w surfactant and a minimum of 50% w/w oil. See E1519 publications from ASTM. The PAM microemulsion may be formulation with such lipophilic adjuvants.

When combined, lipophilic properties of adjuvants and herbicides are well suited to penetrate waxy cuticles of weeds species such as broadleaf and grasses. Lipophilic adjuvants are carriers of the lipophilic herbicides, such as clethodim, into the vascular system of weeds. The herbicides and lipophilic adjuvants are diluted in tank mix water solutions and sprayed for use to control weeds. Once the water evaporates off of a weed surface, the oil carrier and herbicide continue to diffuse through leaf cuticles moving through the vascular system of the weed. Translocation to the root is key to weed control and is enabled by lipophilic adjuvants.

3. Pesticide Formulations

In some embodiments, the PAM microemulsion is included in a formulation comprising at least one pesticide. The pesticide may comprise an insecticide, an herbicide, a bactericide, a fungicide, a larvicide, or a combination thereof. The pesticide may be a lipophilic pesticide. In some embodiments, the composition may further comprise a crop protection enhancing adjuvant, as described above.

A composition (e.g., a tank mix) including, pesticide(s) and lipophilic adjuvant containing microemulsion PAM preferably has 0.625 to 3.5% (v/v) pesticide(s). In some embodiments, the composition comprises 0.125-5% (v/v) of the combination of the polyacrylamide microemulsion and the crop protection enhancing adjuvant. In some embodiments, the composition comprises 0.5 to 1.25% (v/v) of the combination of polyacrylamide microemulsion and the crop protection enhancing adjuvant. In some embodiments, the composition comprises 91.5 to 99.25% (v/v) water. In some embodiments, the composition comprises 95.25 to 98.75% (v/v) water.

The weight ratio of pesticide(s) to microemulsion PAM is preferably in a range of 99:1 to 90:10, more preferably 97:3.

An example of an herbicide that increases spray fines and drift potential is Select Max clethodim. Clethodim is widely used as a grass control herbicide in many tank mixes with other herbicides such as glyphosate, dicamba or 2,4-D to name a few. These other herbicides aid in control of broadleaf weeds but often have little to no control of grass weed species, such as volunteer com. Clethodim has been widely tested for droplet size analysis in wind tunnel trials, such as at UNL PAT Lab, University of Queensland, Battelle and Silsoe Institute research facilities.

Other lipophilic pesticides may be used alone or in any combination with one another, and with or without clethodim. For example other herbicides include, but are not limited to: fenoxaprop; fluazifop; quizalofop; sethoxydim; chlorimuron; foramsulfuron; halosulfuron; iodosulfuron; nicosulfuron; primsulfuron; prosulfuron; rimsulfuron; thifensulfuron; tribenron; imazamox; imasaquin; imazethapyr; flumetsulam; cloransulam; clopyralid; fluroxypyr; diflufenzopyr; atrazine; simazine; metribuzin; bromoxynil; bentazon; linuron; isoxaflutole; mesotrione; tropramezone; acifluorfen; formesafen; lactofen; flumiclorac; sulfentrazone; carfentrazone; ethalfluralin; pendimethalin; trifluralin; bytylate; acetochlor; alachlor; metolachlor; dimenthamid; flufenacet; dithiopyr. For example other fungicides include, but are not limited to: Thiabendazole; Iprodione; Vinclozolin; Imazilil; Triforine; fenarimol; bitertanol; cyproconazole; difenoconazole; fenbuconazole; flusilazole; ipconazole; metconazole; myclobutanil; propiconazole; prothioconazole; tebuconazole; tetraconazole; triadimefon; triadimenol; triticonazole; metalxyl; mefenoxam; cyprodinil; azoxystrobin; picoxystrobin; pyraclostrobin; etridiazole; fenhexamid; polyoxin; fluazinam; dimethomorph; acibenzolar-S-methyl; chlorothalonil; chloroneb; dicloran; quintozene (PCNB); famoxadone; fenamidone; mineral oils; organic oils.

The compositions may be formulated such that the microemulsion PAM is combined with a pesticide, such as in a tank mix. The formulation of the microemulsion PAM with pesticide may be further combined with crop protection enhancing adjuvant(s). Alternatively, the microemulsion PAM may be first combined with crop protection enhancing adjuvant(s), which can then be mixed with a pesticide, such as in a tank mix, prior to use.

It is also useful to formulate microemulsion PAM directly in-can with pesticides for use as a drift reducing agent. The in-can formulations may further contain additional crop protection enhancing adjuvant(s). Many lipophilic herbicides, fungicides, insecticides, and other types of pesticides are well known to decrease droplet size in spray applications, which leads to off-target movement or physical drift of a pesticide spray application. Spray applications occur through with spray equipment pumps and spray pressure with spray nozzles of various spray quality. Often on pesticide labels, it is recommended by basic manufacturers of pesticides to use drift retardants so as to offset physical spray drift potential With this novel approach one can mitigate herbicide drift with the herbicide containing small particle size PAM.

Also disclosed herein is a method comprising contacting agricultural crops, turf and ornamental, or industrial vegetation management pests with the compositions described herein. The compositions can be applied using any common technique known in the art for liquid-based pesticide application, for example, spraying, misting, wiping, and/or with rope wick applicators. Use of the PAM microemulsion with the pesticide may improve quality of a spray application by increasing droplet size (volume mean diameter) and/or lower the percent volume driftable fraction.

4. Examples

Example 1

Adjuvant Formulations

ADJ-1

| Formulation | Component Description | % w/w |
| --- | --- | --- |
| MVO | modified vegetable oil | 62.8% |
| Pluronic L 61 | ethylene oxide - propylene oxide block copolymer | 13.0% |
| Tween 85 | Polyoxyethylene sorbitan trioleate | 10.0% |
| CAS 64015 | ethoxylated lecithin | 2.0% |
| water | water | 2.2% |
| PAM microemulsion - 7 mole % | Polyacrylamide Transparent/Semitransparent Inverse Microlatices | 10.0% |

ADJ-2

| Formulation | Component Description | % w/w |
| --- | --- | --- |
| MVO | modified vegetable oil | 62.8% |
| Pluronic L 61 | ethylene oxide - propylene oxide block copolymer | 13.0% |
| Tween 85 | Polyoxyethylene sorbitan trioleate | 10.0% |
| CAS 64015 | ethoxylated lecithin | 2.0% |
| water | water | 2.2% |
| PAM microemulsion - 15 mole % | Polyacrylamide Transparent/Semitransparent Inverse Microlatices | 10.0% |

ADJ-3

| Formulation | Component Description | % w/w |
| --- | --- | --- |
| MVO | modified vegetable oil | 62.8% |
| Pluronic L 61 | ethylene oxide - propylene oxide block copolymer | 13.0% |
| Tween 85 | Polyoxyethylene sorbitan trioleate | 10.0% |
| CAS 64015 | ethoxylated lecithin | 2.0% |
| water | water | 2.2% |
| PAM microemulsion - 3 mole % | Polyacrylamide Transparent/Semitransparent Inverse Microlatices | 10.0% |

ADJ-4

| Formulation | Component Description | % w/w |
| --- | --- | --- |
| MVO | modified vegetable oil | 62.8% |
| Pluronic L 61 | ethylene oxide - propylene oxide block copolymer | 13.0% |
| Tween 85 | Polyoxyethylene sorbitan trioleate | 10.0% |
| CAS 64015 | ethoxylated lecithin | 2.0% |
| water | water | 2.2% |
| PAM microemulsion - 11 mole % | Polyacrylamide Transparent/Semitransparent Inverse Microlatices | 10.0% |

ADJ-5

| Formulation | Component Description | % w/w |
| --- | --- | --- |
| MVO | modified vegetable oil | 60% |
| PAM microemulsion - 11 mole % | Polyacrylamide Transparent/Semitransparent Inverse Microlatices | 20% |
| Pluronic L 61 | ethylene oxide - propylene oxide block copolymer | 18% |
| Polysorbate 85 | Polyoxyethylene sorbitan trioleate | 2% |

ADJ-6

| Formulation | Component Description | % w/w |
| --- | --- | --- |
| Tolex RMO 70 | paraffinic oil, 70 second (crop oil concentrate (COC)) | 65% |
| PAM microemulsion - 3 mole % | Polyacrylamide Transparent/Semitransparent Inverse Microlatices | 20% |
| Tween 85 | Polyoxyethylene sorbitan trioleate | 10% |
| Fatty Acid | Tall Oil Fatty Acid | 5% |

ADJ-7

| Formulation | Component Description | % w/w |
|---|---|---|
| Tolex RMO 70 | paraffinic oil, 70 second (crop oil concentrate (COC)) | 60% |
| PAM microemulsion - 11 mole % | Polyacrylamide Transparent/Semitransparent Inverse Microlatices | 20% |
| ERS 03203 | Soybean Oil Ethoxylate | 20% |

ADJ-8

| Formulation | Component Description | % w/w |
|---|---|---|
| Tolex RMO 70 | paraffinic oil, 70 second (crop oil concentrate (COC)) | 60% |
| PAM microemulsion - 11 mole % | Polyacrylamide Transparent/Semitransparent Inverse Microlatices | 15% |
| Tween 85 | Polyoxyethylene sorbitan trioleate | 10% |
| Tall Oil Fatty Acid | Tall Oil Fatty Acid | 15% |

ADJ-9

| Formulation | Component Description | % w/w |
|---|---|---|
| Tolex RMO 70 | paraffinic oil, 70 second (crop oil concentrate (COC)) | 65% |
| PAM microemulsion - 11 mole % | Polyacrylamide Transparent/Semitransparent Inverse Microlatices | 15% |
| Fatty Acid | Tall Oil Fatty Acid | 10% |
| Surfonic N95 | nonylphenol ethoxylate | 5% |
| Surfonic N60 | nonylphenol ethoxylate | 5% |
| Tolex RMO 70 | paraffin oil, 70 second | 65% |

ADJ-10

| Formulation | Component Description | % w/w |
|---|---|---|
| Tolex RMO 70 | paraffinic oil, 70 second (crop oil concentrate (COC)) | 70% |
| PAM microemulsion - 11 mole % | Polyacrylamide Transparent/Semitransparent Inverse Microlatices | 12% |
| Fatty Acid | Tall Oil Fatty Acid | 8% |
| Tomadol 1-5 | primary alcohol ethoxylate | 10% |

ADJ-11

| Formulation | Component Description | % w/w |
|---|---|---|
| MVO | modified vegetable oil | 75% |
| PAM microemulsion - 11 mole % | Polyacrylamide Transparent/Semitransparent Inverse Microlatices | 10% |
| Pluronic L 61 | ethylene oxide - propylene oxide block copolymer | 10% |
| Tween 85 | Polyoxyethylene sorbitan trioleate | 5% |

ADJ-12

| Formulation | Component Description | % w/w |
|---|---|---|
| MVO | modified vegetable oil | 80.0% |
| Tween 85 | Polyoxyethylene sorbitan trioleate | 7.5% |
| PAM microemulsion - 11 mole % | Polyacrylamide Transparent/Semitransparent Inverse Microlatices | 12.5% |

ADJ-13

| Formulation | Component Description | % w/w |
|---|---|---|
| MVO | modified vegetable oil | 59.07% |
| Soybean Oil | Soybean Oil | 9.08% |
| PAM microemulsion - 15 mole % | Polyacrylamide Transparent/Semitransparent Inverse Microlatices | 22.73% |
| Tween 85 | Polyoxyethylene sorbitan trioleate | 5.47% |
| Pluronic L 61 | ethylene oxide - propylene oxide block copolymer | 3.65% |

ADJ-14

| Formulation | Component Description | % w/w |
|---|---|---|
| MVO | modified vegetable oil | 53.80% |
| Soybean Oil | Soybean Oil | 10.00% |
| PAM microemulsion - 15 mole % | Polyacrylamide Transparent/Semitransparent Inverse Microlatices | 10.00% |
| Tween 85 | Polyoxyethylene sorbitan trioleate | 10.00% |
| Pluronic L 61 | ethylene oxide - propylene oxide block copolymer | 13.00% |
| CAS 64015 | ethoxylated lecithin | 2.20% |
| water | water | 1% |

ADJ-15

| Formulation | Component Description | % w/w |
|---|---|---|
| MVO | modified vegetable oil | 60% |
| Soybean Oil | Soybean Oil | 20% |
| Pluronic L 61 | ethylene oxide - propylene oxide block copolymer | 5% |
| Tween 85 | Polyoxyethylene sorbitan trioleate | 5% |
| PAM microemulsion - 15 mole % | Polyacrylamide Transparent/Semitransparent Inverse Microlatices | 10% |

ADJ-16

| Formulation | Component Description | % w/w |
|---|---|---|
| MVO | modified vegetable oil | 85.0% |
| Tween 85 | Polyoxyethylene sorbitan trioleate | 10.0% |
| PAM microemulsion - 11 mole % | Polyacrylamide Transparent/Semitransparent Inverse Microlatices | 5.0% |

Each of the adjuvant formulations disclosed above are mixed stepwise, adding the components in order from top to bottom, as listed.

Example 2

Pesticide Formulations

| Pesticide -1 | | |
|---|---|---|
| Formulation | Component Description | % w/w |
| Select Max | clethodim herbicide | 94.5% |
| PAM microemulsion - 11 mole % | Polyacrylamide Transparent/ Semitransparent Inverse Microlatices | 3.0% |
| Fatty Acid | Tall Oil Fatty Acid | 2.5% |

| Herbicide Tank Mix -1 | | |
|---|---|---|
| Ingredient | Description | ounces/acre |
| water | carrier water 15 GPA | 1848.4 |
| PowerMax | glyphosate herbicide | 32 |
| XtendiMax | dicamba herbicide | 22 |
| Select Max | clethodim herbicide | 8 |
| ADJ-2 | MVO HSOC | 9.6 |

| Herbicide Tank Mix -1 | | |
|---|---|---|
| Ingredient | Description | ounces/acre |
| water | carrier water 15 GPA | 1792.4 |
| PowerMax | glyphosate herbicide | 32 |
| XtendiMax | dicamba herbicide | 22 |
| Warrant | acetochlor herbicide | 64 |
| ADJ-1 | MVO HSOC | 9.6 |

| Herbicide Tank Mix -2 | | |
|---|---|---|
| Ingredient | Description | ounces/acre |
| water | carrier water 10 GPA | 1197.2 |
| Liberty | glufosinate herbicide | 32 |
| Zidua Pro | saflufencil, imazethapyr, pyroxasulfone herbicide blend | 6 |
| AMS | ammonium sulfate solution - 34% | 32 |
| ADJ-16 | MVO DRA | 12.8 |

For the herbicide Tank Mixes, hydrophilic herbicide(s) was/were added to water, followed by the addition of lipophilic herbicide(s), followed by the addition of adjuvants. For example, the components may be blended or mixed in stainless steel mixing vats.

| Fungicide Tank Mix-1 | | |
|---|---|---|
| Ingredient | Description | ounces/acre |
| water | carrier water 15 GPA | 1,902.88 |
| Headline | pyraclostrobin fungicide | 12 |
| ADJ-8 | Crop Oil DRA | 5.12 |

| Fungicide Tank Mix-2 | | |
|---|---|---|
| Ingredient | Description | ounces/acre |
| water | | 621.20 |
| Headline AMP | pyraclostrobin + metconazole fungicide | 14.4 |
| ADJ-6 | Crop Oil DRA | 4.0 |

In the above examples, the fungicide was added to water, followed by the addition of adjuvant.

Example 3

Droplet Size Analysis

FIG. 1 shows droplet size wind tunnel results acquired at the Pesticide Application Technology Lab at University of Nebraska. The use rates are provided in the key to the top right or the x-axis for each tank mix additive including XtendiMax (dicamba) herbicide at 22 oz/ac (acre), RoundUp PowerMax ("RPM") at 22 oz/ac (acre), and Select Max (clethodim) at 6 oz/ac (acre), ADJ 984 (lipophilic adjuvant containing small particle emulsion polyacrylamide) at 1 & 2 quarts/100 gal solution, ADJ 1136 (lipophilic adjuvant containing small particle emulsion polyacrylamide) at 0.5 & 1 quarts/100 gal solution. Tests were completed at a wind speed of 15 mph, with the nozzle TTI 11004, at a pressure of 63 psi, and at a spray rate of 10 gallons per acre. Volume Median Diameter (VMD) results are shown in micron particle size or droplet sizes (y-axis). XtendiMax alone was used as a control, first bar to the left in FIG. 1. Results at or above the horizontal line (for XtendiMax alone at slightly below 700 microns) containing lipophilic herbicide tank mixes were considered to represent positive results. When XtendiMax, RPM, and Select Max were tank mixed and atomized or sprayed, the VMD was lower compared to XtendiMax alone. This was considered a negative result with the TTI 11004 nozzle and shows that with Select Max a lipophilic herbicide will decrease VMD.

The two adjuvant formulations. ADJ 984 & ADJ 1136, were used at various use rates as described above to increase the VMD with XtendiMax, RPM, and Select Max. Both ADJ 984 and ADJ 1136 are lipophilic adjuvants—oil based deposition aids and drift reduction agents, which comprise transparent/semitransparent inverse microlatices. The transparent/semitransparent inverse microlatices adds drift reduction agent functionality to an otherwise solely deposition aid formulation. ADJ 1136 contains a higher % w/w of the transparent/semitransparent inverse microlatices compared to ADJ 984.

ADJ 984 showed a dose dependent increase in the VMD further as the use rate increased (e.g., from 1 qt to 2 qt.). A similar result with ADJ 1136 was also achieved by increasing the use rate from 0.5 qt to 1 qt. A desirable result with the novel small particle emulsion polyacrylamide containing lipophilic adjuvant, such as ADJ 984 or ADJ 1136, utilizing the TTI 11004 nozzle is important because Select Max requires a lipophilic adjuvant for best weed control results but normally would require a separate tank mix drift reduction agent.

FIG. 2 shows the driftable fraction recognized by the EPA as droplet sizes <(less than) 141 microns under the same test conditions as in FIG. 1. It is desirable to lower the driftable fraction compared to XtendiMax alone. Any result at or below the horizontal line (at about 0.7% vol for XtendiMax alone) containing lipophilic herbicide tank mixes was considered a positive result. The tank mix of herbicides alone, including XtendiMax, RPM, and Select Max increased the driftable fraction by % volume. Increasing the driftable fraction increases herbicide spray drift potential. This is a negative result and will not pass the EPA testing guidelines. All use rates for microemulsion PAMs ADJ 984 & ADJ 1136 lowered the driftable faction by % volume. That is a positive result for the lipophilic adjuvant containing small particle emulsion polyacrylamide.

Figure 3:
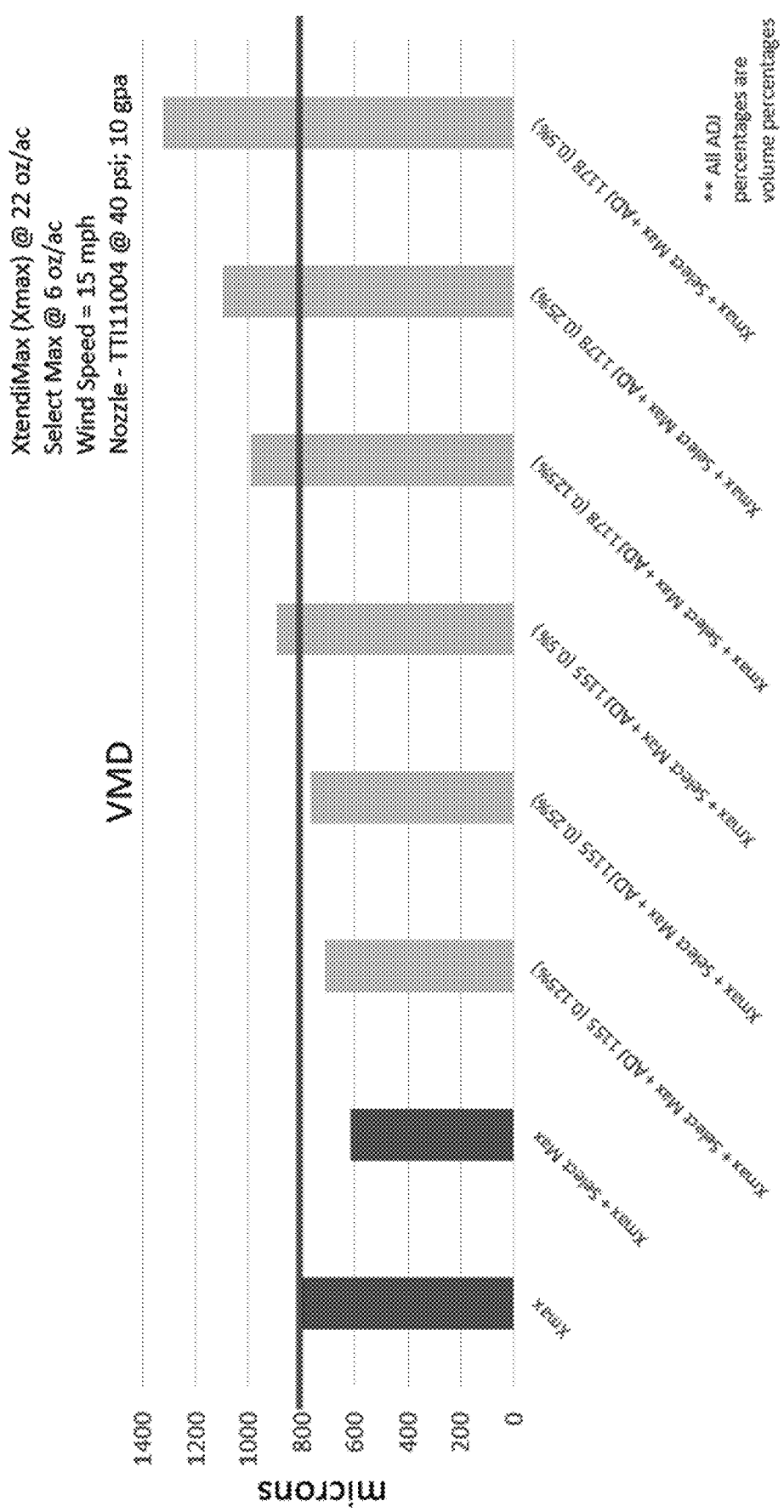
FIG. 3 is a graph of VMD of Herbicides and Adjuvants from droplet size wind tunnel tests. Use rates and test parameters are provided in the key to the top right. At or above the line indicates probability to pass EPA wind tunnel AGDISP model.

FIG. 3 shows droplet size wind tunnel results acquired at the Pesticide Application Technology Lab at University of Nebraska. The use rates are provided in the key to the top right or in the x-axis for each tank mix additive including XtendiMax (dicamba) herbicide at 22 oz/ac (acre), and Select Max (clethodim) at 6 oz/ac (acre), ADJ 1155 (lipophilic adjuvant containing small particle emulsion polyacrylamide) at 0.125% v/v (0.5 qt/100 gal solution), 0.25% v/v (1 qt/100 gal solution) & 0.5% v/v (2 qt/100 gal solution)/100 gal solution. ADJ 1178 (lipophilic adjuvant containing small particle emulsion polyacrylamide) at 0.125% v/v (0.5 qt/100 gal solution), 0.25% v/v (1 qt/100 gal solution) & 0.5% v/v (2 qt/100 gal solution)/100 gal solution. Tests were completed at a wind speed of 15 mph, with the nozzle TTI 11004, at a pressure of 40 psi, and at a spray rate of 10 gallons per acre. Volume Median Diameter (VMD) results are shown in micron particle size or droplet sizes. XtendiMax alone was used as a control, first bar to the left. Results at or above the horizontal line (at slightly below 700 microns corresponding to XtendiMax) containing lipophilic herbicide tank mixes were considered positive. When XtendiMax and Select Max were tank mixed and atomized or sprayed, the VMD was lower compared to XtendiMax alone. This was considered a negative result with the TTI 11004 nozzle and shows that with Select Max a lipophilic herbicide will decrease VMD.

The two adjuvant formulations, ADJ 1155 and ADJ 1178, were used at various use rates as described above increase the VMD with XtendiMax and Select Max. ADJ 1155 and ADJ 1178, both lipophilic adjuvants, contain the small particle emulsion polyacrylamide. ADJ 1155 and ADJ 1178 differ due to the inclusion rate of the small particle emulsion polyacrylamide. ADJ 1155 showed a dose dependent increased in the VMD as the use rate increased. A similar result with ADJ 1178 was also achieved by the use rate. A desirable result is shown with the lipophilic adjuvants utilizing the TTI 11004 nozzle. A desirable result with the novel small particle emulsion polyacrylamide containing lipophilic adjuvant, such as ADJ 1155 or ADJ 1178, utilizing the TTI 11004 nozzle is important because Select Max requires a lipophilic adjuvant for best weed control results but normally would require a separate tank mix drift reduction agent.

Figure 4:
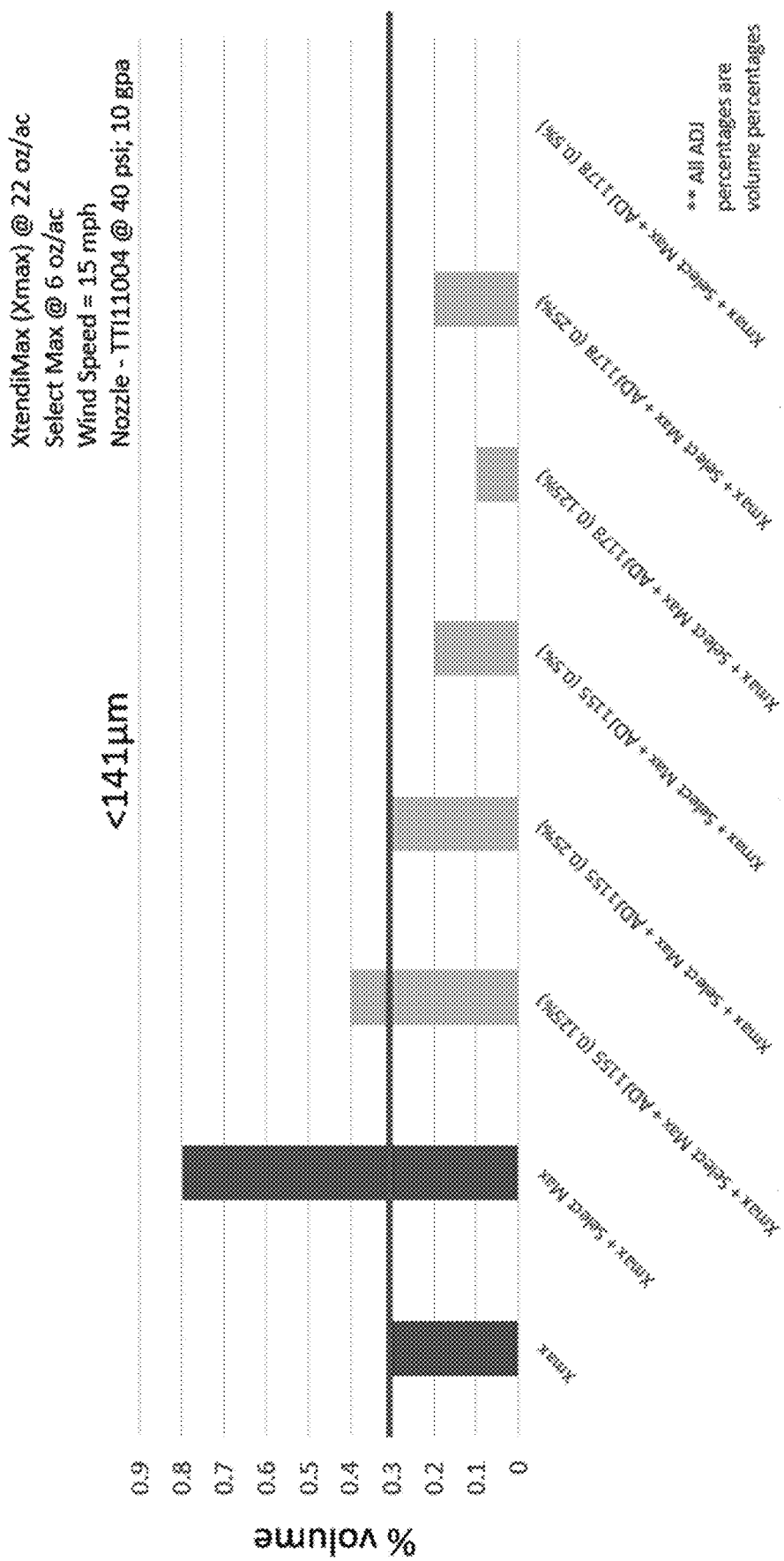
FIG. 4 is a graph of % Volume Driftable Fraction <141 μm of Herbicides and Adjuvants from droplet size wind tunnel tests. Use rates and test parameters are provided in the key to the top right. At or below the red line indicates probability to pass EPA wind tunnel AGDISP model.

FIG. 4 shows the driftable fraction recognized by the EPA as droplet sizes <141 microns under the same test conditions as in FIG. 3. It is desirable to lower the driftable fraction compared to XtendiMax alone. Any result at or below the horizontal line (for XtendiMax alone at about 0.3% vol) containing lipophilic herbicide tank mixes was considered a positive result. The tank mix of herbicides alone, including XtendiMax and Select Max increased the driftable fraction by % volume. Increasing the driftable fraction increases herbicide spray drift potential. This is a negative result and will not pass the EPA testing guidelines. ADJ 1155 showed a dose dependent in that increasing the use rate continued to lower the driftable fraction <141 microns. The 0.125% use rate of ADJ 1155 did not contain an adequate amount of small particle emulsion polyacrylamide. ADJ 1178 lowered the driftable fraction by % volume with all 3 use rates.

Figure 5:
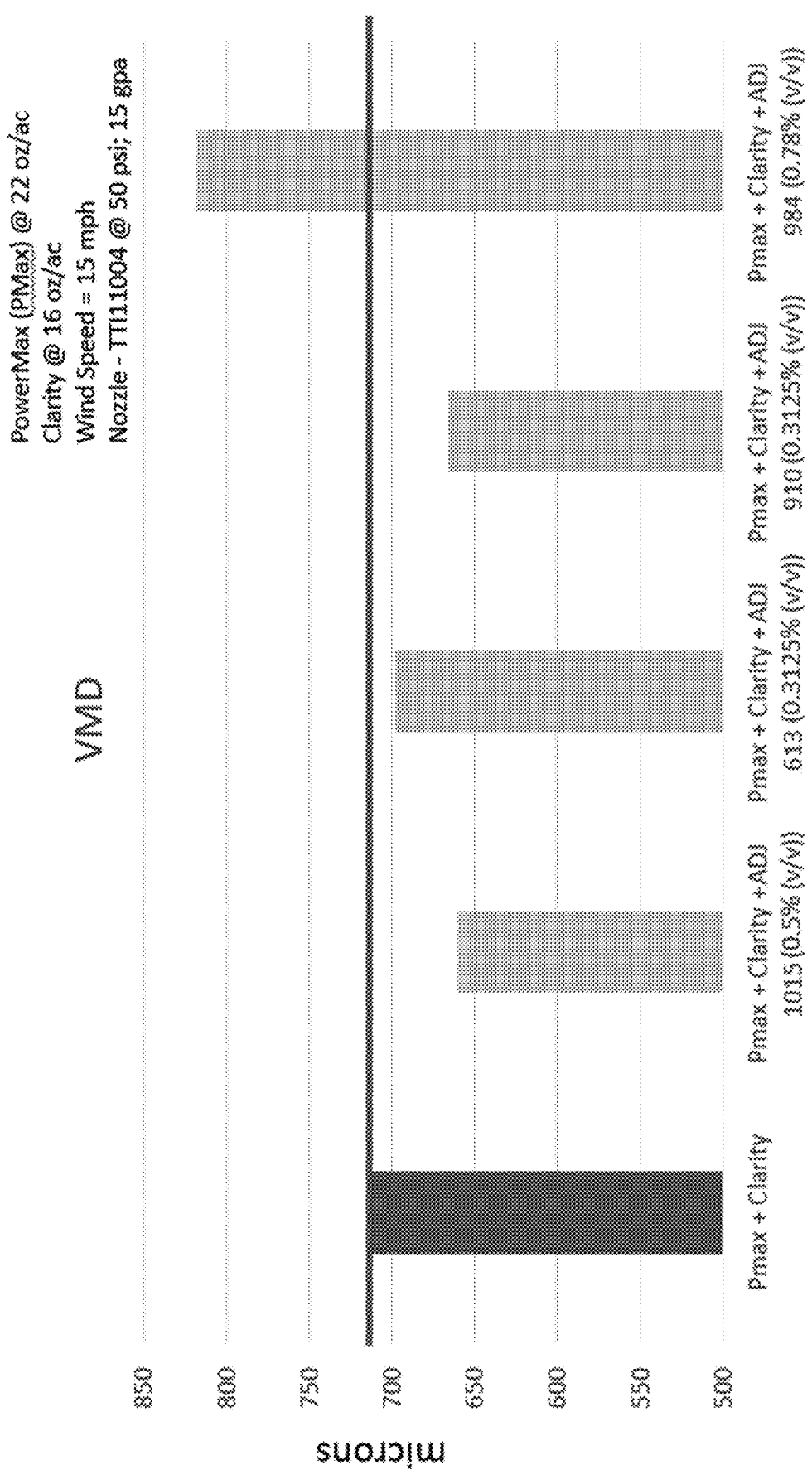
FIG. 5 is a graph of VMD of Herbicides and Adjuvants from droplet size wind tunnel tests. Use rates and test parameters are provided in the key to the top right. At or above the line indicates probability to pass EPA wind tunnel AGDISP model.

FIG. 5 shows droplet size wind tunnel results acquired at the PAT Lab at University of Nebraska. The use rates are provided in the key to the top right or in the x-axis for each tank mix additive including PowerMax (glyphosate) herbicide at 22 oz/ac (acre), and Clarity (dicamba) at 16 oz/ac (acre). ADJ 1015 (Masterlock—a commercial oil-based deposition aid, canopy penetration & drift reduction agent) at 0.5% v/v (2 qt/100 gal solution), ADJ 613 (Interlock—a commercial oil-based deposition aid, canopy penetrating, coverage, spreader, sticker and drift control) at 0.3125% v/v (1.25 qt/100 gal solution), ADJ 910 (Polytex L 550—a commercial oil-based deposition aid and drift reduction agent) at 0.3125% v/v (1.25 qt/100 gal solution), and ADJ 984 (an oil-based deposition aid and drift reduction agent that contains transparent/semitransparent inverse microlatices) at 0.78% v/v (3.12 qt/100 gal). Tests were completed at a wind speed of 15 mph, with the nozzle TTI 11004, at a pressure of 50 psi, and at a spray rate of 15 gallons per acre. Volume Median Diameter (VMD) results are shown in micron particle size or droplet sizes. PowerMax+Clarity alone was used as a control, first bar to the left. Results at or above the horizontal line (at slightly above 700 microns corresponding to PowerMax+Clarity) for the herbicide tank mix were considered to represent positive result. When PowerMax and Clarity were tank mixed and atomized or sprayed with the oil-based adjuvants, as with ADJ 1015, ADJ 613, and ADJ 910, the VMD was lower compared to PowerMax and Clarity alone. This was a negative result with the TTI 11004 nozzle and showed that even without a lipophilic herbicide the VMD is decreased.

ADJ 984 increased the VMD, which was a positive result. Though all formulations or commercial products claim to be a drift reduction agent, only ADJ 984 containing transparent/semitransparent inverse microlatices had a positive result with the TTI 11004 nozzle as a drift reduction agent and raised the VMD to >800 microns.

Figure 6:
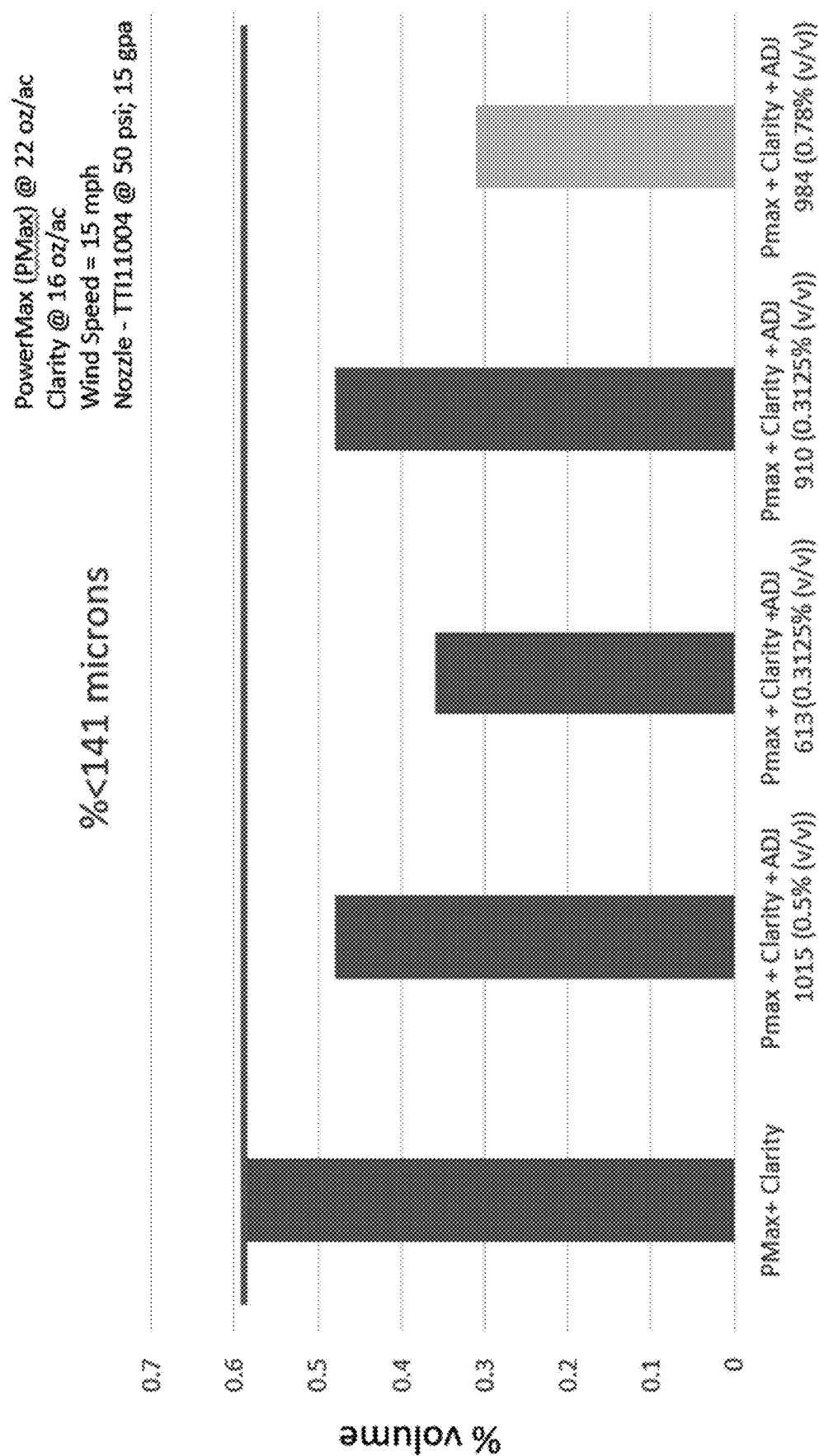
FIG. 6 is a graph of % Volume Driftable Fraction <141 μm of Herbicides and Adjuvants from droplet size wind tunnel tests. Use rates and test parameters are provided in the key to the top right. At or below the line indicates probability to pass EPA wind tunnel AGDISP model.
Figure 7B:
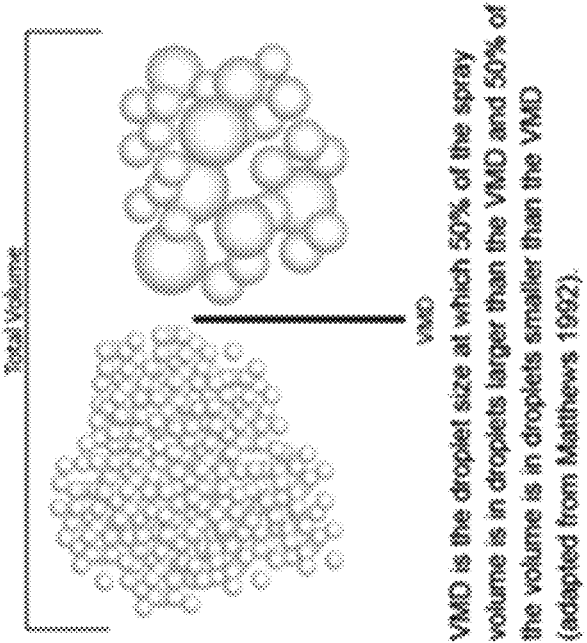
FIG. 7B is descriptions of droplet VMDs.

FIG. 6 shows the driftable fraction recognized by the EPA as droplet sizes less than 141 microns under the same conditions as in FIG. 5. When PowerMax and Clarity are tank mixed and atomized or sprayed with the oil-based adjuvants, as with ADJ 1015, ADJ 613, ADJ 910, and ADJ 984, the % volume <141 microns is shown. All adjuvants lowered the % volume <141 microns. ADJ 984 was the best (at or slightly above 0.3%), and all adjuvants showed a positive result.

The data in FIGS. 1-6 shows an increase in VMD (volume median diameter) and decrease in driftable fraction with herbicide formulations (tank mixes) comprising the lipophilic adjuvants comprising the transparent/semitransparent inverse microlatices and lipophilic oil adjuvant compared to formulations comprising tank mix drift reducing adjuvant alternatives that are solution or hydrophilic based. The lipophilic herbicide in clethodim and dicamba without microemulsion PAM showed an increase in VMD and % driftable fraction (e.g., droplet sizes of 141 microns or lower that are most susceptible to drift).

Additional compositions comprising PAM microemulsions as described herein were successfully able to act as a drift reducing agent in over 98% of tank mixes tested (total of 250). In addition, PAM microemulsion compositions were also successfully used with Engenia (dicamba) and Engenia Pro (dicamba and pyroxasulfone).

An increasingly important herbicide tank mix for weed control in bioengineered soybean and cotton seed crops is a combination of PowerMax (Bayer Crop Sciences glyphosate), XtendiMax (Bayer Crop Sciences dicamba) and Select Max (Valent BioSciences clethodim). EPA regulation for this type of weed control application comes with many use restrictions and guidelines, which are illustrated on each pesticide label. One such restriction is with the EPA nozzle mandate TTI11004 (TeeJet Spraying Systems) nozzle. Applicators must use this nozzle in particular to comply the EPA regulation associated with the TTI11004 nozzle. EPA mandates droplet size spray testing analysis as part of an approval process for any additives that are to be used with XtendiMax herbicide. This process is for any adjuvant or pesticide, etc. Part of the EPA-based criteria is that any tank mix partner tested (e.g., added pesticide) must not decrease the VMD (volume median diameter) of the spray solution. Nor must it increase the spray drift fraction (% volume of drops less than or equal to 141 microns) compared to XtendiMax alone. Select Max is well known to decrease VMD and increase drift potential. Select Max requires the addition of a DRA to be legal to spray according to the EPA mandates. Approved EPA DRA additives are listed on the Bayer web site, and include, for example, OnTarget™, Padlock® DRA, Brandt Adjulock®, and Raider DRAs.

The compositions described herein relieve the applicator of the need for adding a separate tank mix DRA because the clethodim herbicide product contains a small particle size PAM (the transparent/semitransparent inverse microlatices) in the lipophilic tank mix adjuvant which increases VMD (volume median diameter) and lowers the driftable fraction by volume <141 microns. An example clethodim formulation includes (by w/w) 97% Select Max 97% and 3% Polyacrylamide Transparent/Semitransparent Inverse Microlatices.

Thus, an advantage of formulations described herein is that users (e.g., distributors, applicators, etc.) of sprays, such as pesticide sprays, can add less material to the tank mix, which reduces time, storage space, freight costs, and inventories.

Example 4

Weed Control

Two weed control studies (Winamac, Ind.; Sharon, Wis.), using a randomized complete block design with four replications, were conducted to evaluate how high surfactant oil concentrates (HSOC) products improve efficacy of clethodim for control of volunteer corn. A mixture of herbicides (Xtendimax+Roundup PowerMax+Clethodim) was sprayed over research plots with and without adjuvants. The adjuvant treatments included ADJ 1246 (HSOC, embodiment of the invention), ADJ 1250 (HSOC; embodiment of the invention), and TOLEX ME 6040 (standard HSOC with no drift control properties). The spray was delivered using TTI nozzles to deliver a spray volume of 15 gallons of solution per acre. The plots were evaluated regularly to characterize % weed control by visual rating of weed volume reduction. The data were analyzed using Analysis of Variance and means were separated using Fisher's Protected Least Significant Difference (LSD).

Figure 8A:
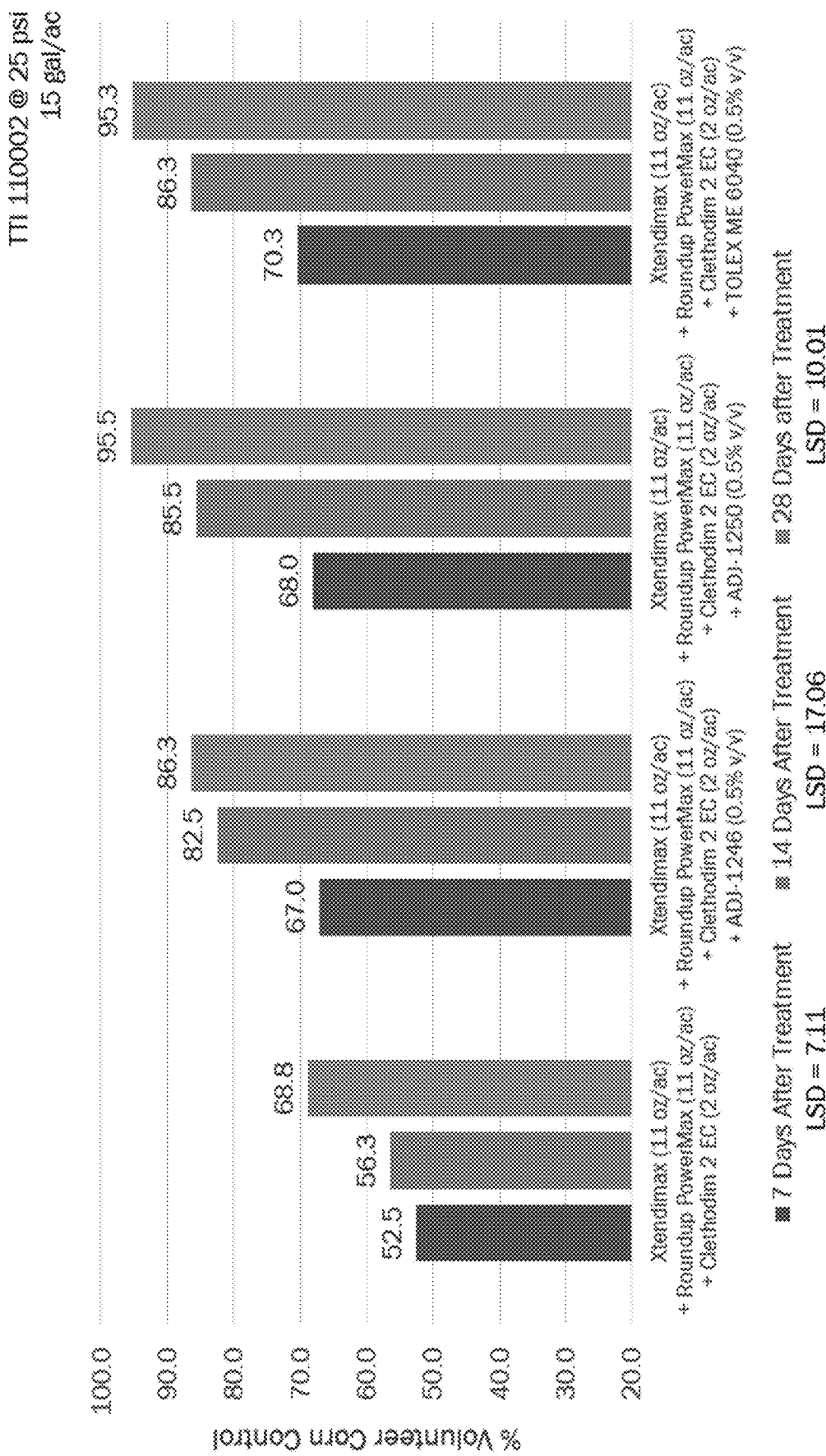
FIGS. 8A and 8B are graphs of % weed control from two weed control studies conducted using randomized complete block design with four replications.
Figure 8B:
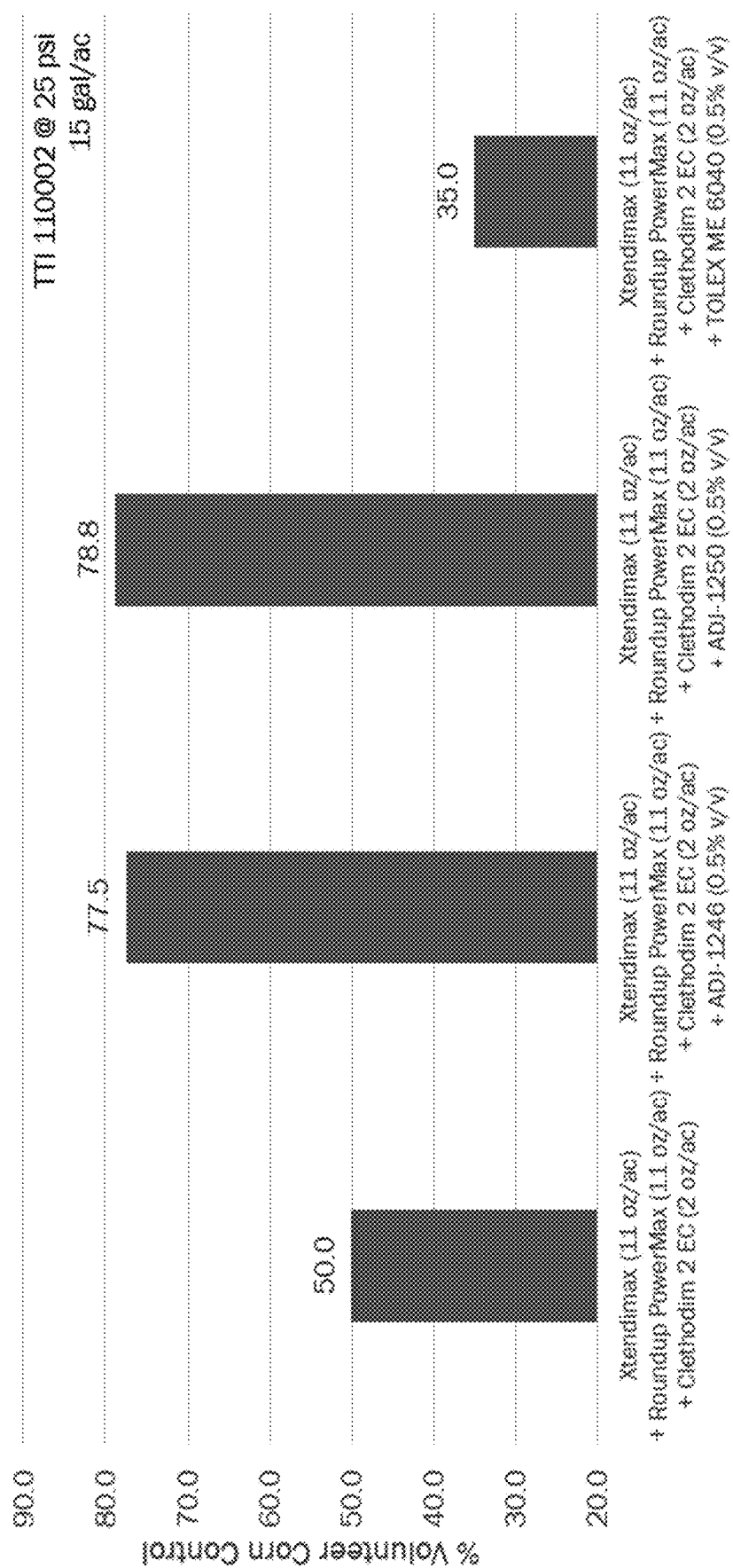

In FIG. 8A, two embodiments of the invention—ADJ 1246 and ADJ 1250—demonstrated improved control of volunteer corn vs. a treatment containing no adjuvant, and similar control to a standard HSOC, supporting use in formulations to decrease drift without decreasing the efficacy of the product. In FIG. 8B, two embodiments of the invention—ADJ 1246 and ADJ 1250—demonstrated improved control of volunteer corn vs. a treatment containing no adjuvant, and improved control to a standard HSOC, supporting use in formulations to decrease drift while increasing the efficacy of the product.

It is understood that the foregoing detailed description and accompanying examples are merely illustrative and are not to be taken as limitations upon the scope of the disclosure, which is defined solely by the appended claims and their equivalents.

Various changes and modifications to the disclosed embodiments will be apparent to those skilled in the art and may be made without departing from the spirit and scope thereof.

What is claimed is:

1. A method comprising spraying agricultural crops, turf and ornamental, or industrial vegetation management pests using a nozzle having a spray quality of coarse to ultra coarse with a composition comprising a polyacrylamide microemulsion and at least one or both of a pesticide and a crop protection enhancing adjuvant,
wherein the polyacrylamide microemulsion is a transparent/semitransparent inverse microlatice, and
wherein the composition increases droplet size or decreases the percent volume driftable fraction of a spray compared to a composition lacking the microemulsion polyacrylamide (PAM).

2. The method of claim 1, wherein the polyacrylamide microemulsion comprises polyacrylamide having 0-22 mole percent anionic charge.

3. The method of claim 1, wherein the polyacrylamide microemulsion comprises polyacrylamide having 3-18 mole percent anionic charge.

4. The method of claim 1, wherein the polyacrylamide microemulsion comprises polyacrylamide having 7-15 mole percent anionic charge.

5. The method of claim 1, wherein the polyacrylamide microemulsion comprises polyacrylamide having 15-22 mole percent anionic charge.

6. The method of claim 1, wherein the crop protection enhancing adjuvant is selected from the group consisting of: crop oil concentrates, modified vegetable oils, drift retardants, soil or foliage penetrants, buffering agents, wetting agents, surfactants, nitrogen fertilizers, compatibility agents, defoamers, deposition agents, or combinations thereof.

7. The method of claim 1, wherein the crop protection enhancing adjuvant is a lipophilic adjuvant.

8. The method of claim 1, wherein the pesticide comprises an insecticide, a herbicide, a bactericide, a fungicide, a larvicide, or a combination thereof.

9. The method of claim 1, wherein the pesticide comprises lipophilic pesticide.

10. The method of claim 1, wherein the composition comprises 0.625-3.5% v/v pesticide.

11. The method of claim 1, wherein the weight ratio of pesticide to polyacrylamide microemulsion is in a range of 99:1 to 90:10.

12. The method of claim 11, wherein the weight ratio of pesticide to polyacrylamide microemulsion is 97:3.

13. The method of claim 1, wherein the composition comprises a pesticide and 0.125-5% v/v of the combination of the polyacrylamide microemulsion and the crop protection enhancing adjuvant.

14. The method of claim 1, wherein the polyacrylamide microemulsion comprises polyacrylamide having less than 30 mole percent anionic charge.

\* \* \* \* \*